United States Patent [19]

Gillet

[11] 4,329,602
[45] May 11, 1982

[54] SUPERCONDUCTING ROTOR

[75] Inventor: Roger Gillet, Belfort, France

[73] Assignees: Alsthom-Atlantique; Electricite de France, both of Paris, France

[21] Appl. No.: 184,859

[22] Filed: Sep. 8, 1980

[30] Foreign Application Priority Data

Sep. 10, 1979 [FR] France .................................. 79 22553

[51] Int. Cl.$^3$ ...................... F16J 15/02; H02K 9/193; H02K 1/22
[52] U.S. Cl. ......................................... 310/52; 277/25
[58] Field of Search ...................... 310/10, 40, 52, 54, 310/57; 418/104; 277/13, 25

[56] References Cited

U.S. PATENT DOCUMENTS 3,942,053  3/1976  Abolins et al. ......................... 310/52
4,060,743  11/1977  Weghaupt ............................. 310/52
4,117,357  9/1978  Baumann ............................... 310/52

FOREIGN PATENT DOCUMENTS 2816084  10/1978  Fed. Rep. of Germany ........ 277/25
7427156  3/1975  France ................................... 310/52
7419671  1/1976  France ................................... 310/52

Primary Examiner—J. D. Miller
Assistant Examiner—D. L. Rebsch
Attorney, Agent, or Firm—Sughrue, Mion, Zinn, Macpeak and Seas

[57] ABSTRACT

The invention relates to the connection means used in a superconducting rotor to mechanically connect a "cold" inductor to a "hot" shaft. An inner ring (50) locks against an outer ring (52) under the effect of centrifugal force applied by the rotation of the rotor on fly-weights (54) fixed to the inner ring. Application to manufacturing cryoalternators.

7 Claims, 3 Drawing Figures

SUPERCONDUCTING ROTOR

FIELD OF THE INVENTION

The invention relates to a superconducting rotor comprising a "cold" inductor and a "hot" shaft, together with connection means holding them together.

BACKGROUND

The invention applies more particularly to manufacturing an alternator whose rotor includes superconducting inductor windings, i.e. made of a substance which becomes superconducting when it is cooled to a sufficiently low or "cryogenic" temperature and equal, for example, to 4° K. In addition to these windings and the electrical connection means necessary to power them, the rotor also includes a cooling circuit which is capable of cooling the windings from ambient temperature to said cryogenic temperature before the alternator is brought into action, and thereafter of maintaining said windings at that temperature. Said circuit includes a refrigerator machine, e.g. a helium liquefier. The lower the temperature to be reached, the higher the cooling power necessary for maintaining superconductivity, i.e. the power which must be supplied to the refrigerator machine, and, for a given temperature, that power is proportional to the heat lost from the rest of the apparatus to the cryogenic windings, i.e. to the heat flow which must be removed.

To reduce said heat flow, the rotor is separated into a plurality of zones including:

a "hot" zone which remains substantially at ambient temperature during operation and whose principal component is the shaft which provides mechanical rigidity of the rotor as a whole while allowing it to rotate between two bearings;

a "cold" zone which may be called the inductive zone because it includes the windings; said cold zone is brought to cryogenic temperature during operation; and thermal transition members which provide mechanical connection between the shaft and the inductor, i.e. which carry the inductor by bearing against suitable support structures forming part of the shaft, the temperature of these members in operation increasing from a cold end adjacent the inductor to a hot end adjacent the support structure.

Heat losses due to the temperature difference between the cold zone and the neighbouring hot zone result from radiation and from conduction, a vacuum being provided to prevent heat loss by convection. Highest heat losses are due to conduction. They decrease with the thermal resistance between the two zones. What is meant here by "thermal resistance" of a component with a cold end and a hot end is the ratio of the temperature difference between these two ends divided by the rate of heat flow along the component from the hot end to the cold end. Said thermal resistance can be measured in degrees Kelvin per watt (K/W).

When very low temperatures such as 4° K. have to be maintained in large spaces the necessary cooling power becomes very expensive and it is sought to increase the thermal resistance between the cooled zone and the non-cooled zone. For this purpose, heat insulating materials are used. As for the transition members which provide mechanical connection between these zones, their thermal resistance is increased by increasing their length and reducing their cross-section. However, the thermal resistance which can thus be provided is not as great as is required unless mechanical strength is excessively reduced.

To obtain both suitable mechanical characteristics and minimum heat losses, the shaft is made in the form of: a large-diameter rigid tube which surrounds the inductor without coming into contact therewith. Two circular discs close respective ends of the tube and two hollow shaft ends of smaller diameter than the tube, projecting axially from has the centers of respective ones of the discs engage in bearings. The inductor has the shape of a sealed drum located inside the rigid tube and extended at each end by a thin tube of the same diameter as the sealed drum, said tube constituting a thermal transistor member. Each transition tube bears against a respective support structure which is integral with the shaft and is located in the vicinity of a respective one of the end discs. The assembly has a cylindrical structure about the axis of rotation of the rotor.

The fact that the inductor is subject to temperature variations which are very different from those to which the shaft is subject causes longitudinal movements of the ends of the inductor with respect to the support structures, especially at the beginning and at the end of the periods when the inductor is kept cold. It is possible for these relative movements to be made without damage by elastic deformation of the support structures. However, these structures, like the thermal transition tubes, must be able to transmit all of the rotor drive torque to the inductor. The use of elastic deformation therefore entails the use of large parts. This appreciably increases the dimensions and the cost of the rotor.

AIM OF THE INVENTION

The present invention aims to produce a superconducting rotor with connection means for connecting the cold inductor to the shaft, allowing the ends of the inductor to move longitudinally with respect to the shaft without being damaged, and without appreciably increasing the weight or the cost of the rotor.

THE INVENTION

The present invention provides a superconducting rotor with connection means connecting a "cold" inductor to a "hot" shaft, said rotor being generally radially symmetrical about its longitudinal axis of rotation.

It includes a "hot" shaft being rigid and supporting the rotor and including two support structures that are longitudinally separated from each other.

Said "cold" inductor includes superconducting windings and is borne between said two support structures by mechanical connections.

Electrical connection means feeding power to the windings of the inductor.

A cooling circuit cooling down the inductor from ambient temperature to a cryogenic temperature and thus putting these windings in a superconducting state.

Further, at least one of said mechanical connections between the cold inductor and the hot support structures includes connection means comprising;

an outer ring which is coaxial with the axis of rotation and integral with one of the two parts (shaft/inductor) connected thereby;

an inner ring which is integral with the other of said two parts and is disposed coaxially against the inner surface of the outer ring; and fly-weights spaced out angularly and fixed to the inner ring so that the centrifugal force exerted on the fly-weights by rotation of the rotor expands the inner ring and presses it against the outer ring to lock these two rings together during rotation while allowing relative longitudinal movement thereof when there is no rotation.

BRIEF DESCRIPTION OF THE DRAWINGS

An embodiment of a rotor in accordance with the invention is described hereinafter by way of a non-limiting example and with reference to the following accompanying figures.

DESCRIPTION OF THE PREFERRED EMBODIMENT

Figure 1:
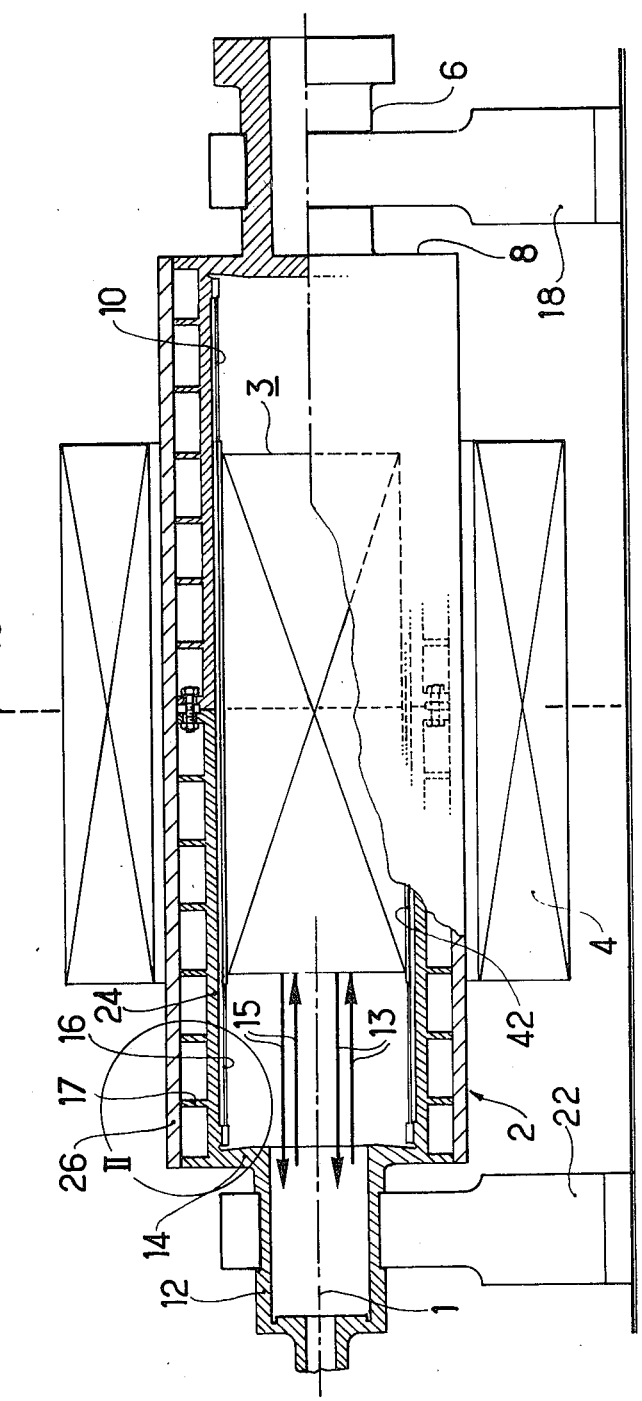
FIG. 1 is a cross-section of a rotor in accordance with the invention through a plane which passes through the axis of said rotor.

A cryoalternator includes a turbine, not illustrated, located to the right of FIG. 1. The turbine drives a rotor 2 which includes an inductor 3 cooled to 4° K. by helium, said inductor containing superconducting windings turning about an axis 1. The alternator further includes a stator 4 disposed around the rotor 2, said stator having windings constituted by normal electric conductors in which the AC output of the alternator is induced.

The central portion of the rotor 2 is supported and driven by two horizontal shaft ends: a turbine side end 6 connected to a plane circular end disc 8 and a "supply" side end 12 connected to end disc 14.

The turbine side shaft end 6 is supported by a bearing 18 at ordinary temperature. It is mechanically driven by the turbine shaft which is not shown.

The supply side shaft end 12 is hollow and contains helium inlet and outlet ducts 13 in an axial portion. The ducts are connected by rotating connections, not shown, to a helium liquefier, not shown, so as to enable the inductor to be cooled to a temperature of 4° K.

The hollow axial portion of the shaft end 12 also contains conductors 15 to supply electricity to the rotor and the shaft end 12 is supported by a bearing 22 at ordinary temperature.

The end discs 8 and 14 are connected to each other by a very thick rigid metal tube 24 which surrounds the inductor 3 and transition tubes 10 and 16 constituted by thin metal tubes whose diameter is the same as that of the inductor 3. These transition tubes mechanically connect each end of the inductor to the rigid tube 24 in the vicinity of a respective one of the discs 8 and 14. The rigid tube 24 is at ordinary temperature. It is made of a titanium alloy, has circular outer ribs 17 and is covered on the outside with an aluminum damper screen 26. It mechanically joins the disc 8 to the disc 14, i.e. firstly, it maintains the alignment of the shaft ends 6 and 12 and secondly it transmits at least half the rotation torque applied by the turbine (not shown) to the end disc 14 at the supply side. Further, it is fixed to the end discs 8 and 14 in a sealed manner and a vacuum is established inside it to provide good heat insulation between the rigid tube 24 and the inductor 3.

The rigid shaft constituted by the shaft ends 6 and 12, the discs 8 and 14 and the rigid tube 24 is assembled from two parts, each of which is formed by welding various components together (a shaft end, a disc and a half length of rigid tube) and each half length occupies a respective side of a transverse mid plane 40. The material used is a non-magnetic alloy such as the titanium alloy TA6V and has strong mechanical characteristics. The inductor 3, fitted with its transition tubes 10 and 16, is surrounded at both ends by these two parts, and the assembly is bolted together at the mid plane 40. This is a favourable position since circular bending (i.e. deformation of the circular cross-section) does not occur to as large an extent in this position as it does at the ends.

The damper screen 26 is a tube made by centrifugal casting of an aluminium alloy which has low electric resistance and good mechanical characteristics. It is installed hot over the periphery of the ribs 17 and allowed to shrink on to the ribs by cooling to obtain tight clamping that fixes the screen firmly under all circumstances.

Figure 2:
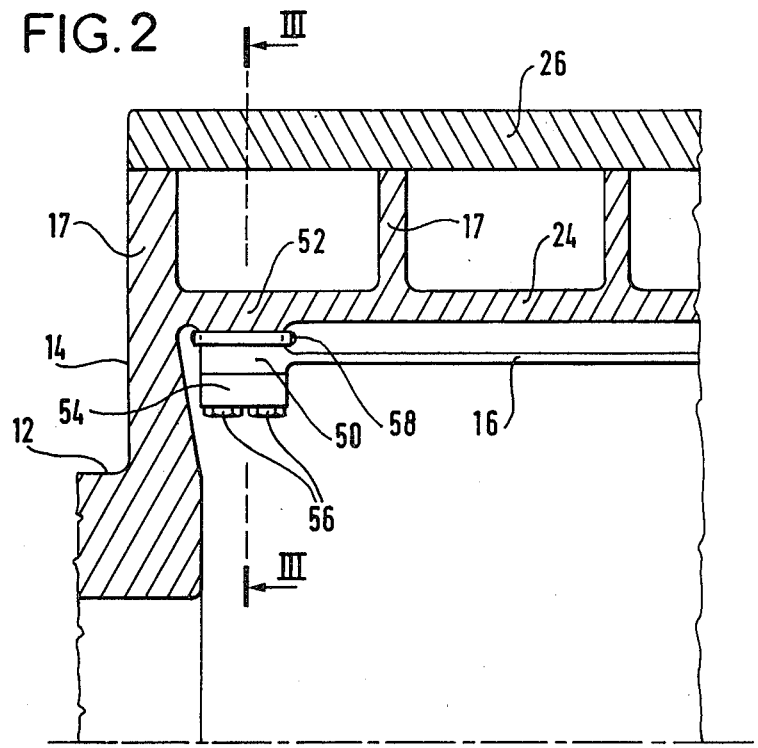
FIG. 2 is an enlarged sectional view which shows a detail of FIG. 1.
Figure 3:
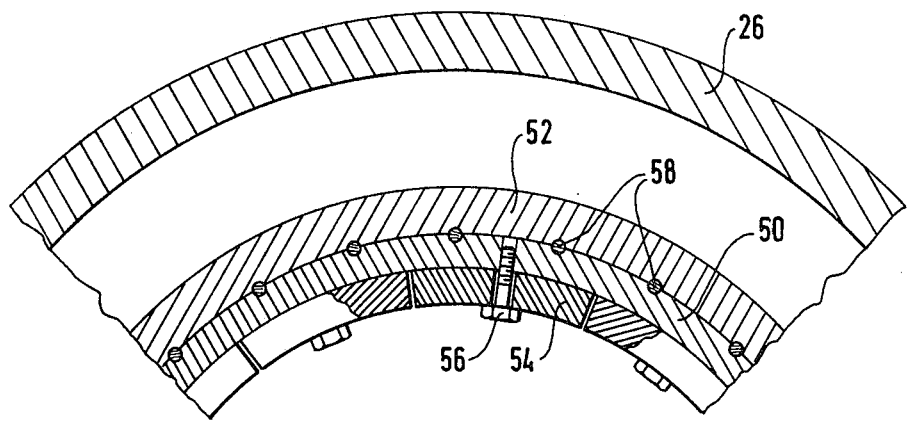
FIG. 3 is a partial cross-section of the rotor of FIGS. 1 and 2 through a plane III—III, perpendicular to the axis of the rotor.

The means for connecting the transition tube 16 will now be described, it being understood that identical means are used for the tube 10. At the cold end, connection is due to the fact that the tube 10 forms a continuous part with an outer tube 42 that forms part of the inductor 3 and is fitted hot on to the body thereof to form a banded connection, i.e. the tubes 10 and 16 and the outer tube 42 constitute a single tubular member. At the hot end, connection is provided by connection means constituted mainly by an inner ring 50 (FIG. 2), an outer ring 52 and fly-weights 54. These components all have the same length parallel to the axis of the rotor and coincide when the inductor is cold.

The inner ring 50 is constituted by a thickened portion of the hot end of the tube 16. It is sufficiently thin to be able to expand due to the effect of the centrifugal force exerted by the fly-weights 54 each of which is fixed to the inner surface of the ring 50 by two axially separated screws 56 passing through the centre line of the fly-weight. The fly-weights are regularly spaced around the entire inner surface of the ring 50.

The outer ring 52 forms part of the previously mentioned "support structure" which also includes the end disc 14 and the tube 24. It is constituted by a thickened portion of the rigid tube 24, with the extra thickness extending inwardly and sufficient to support the greater part of the centrifugal force which results from rotation of the fly-weights 54 and of the inner ring 50 without any appreciable expansion.

When there is no rotation and hence no centrifugal force, the connection means allows the rings to move longitudinally relative to each other. When the rotation speed reaches its rated value, centrifugal force thrusts the inner ring against the outer ring with a force which provides effective blocking.

To prevent relative rotation of the two rings when the rotor rotates at low speed, angular blocking is effected by guides constituted by round, axially-extending cylindrical pins 58 inserted between the two rings. These pins also assist in transmitting torque under various circumstances. For example, there are twice as many pins as there are fly-weights and they are regularly disposed angularly, e.g. with each pin at an equal angular distance from the middle of and from one edge of the nearest fly-weight.

The inductor is cooled down while it rotates at low speed and while centrifugal force is negligible.

During this time, thermal contraction can take place by sliding while leaving minimum play.

In contrast, at synchronous speed, the connection means provides rigid connection between the cold portion and the shaft, preventing any vibration, and transmitting torque.

I claim:

1. A superconducting rotor, said rotor being generally radially symmetrical about its longitudinal axis of rotation and including:
   a "hot" shaft part which is rigid and supports the rotor components and including two support structures that are longitudinally separated from each other;
   a "cold" inductor part which includes superconducting windings and being borne between said two support structures by mechanical connections;
   electrical connection means for feeding power to the windings of the inductor part; and
   a cooling circuit for cooling down the inductor part from ambient temperature to a cryogenic temperature and for placing these windings in a superconducting state; the improvement wherein at least one of said mechanical connections between the cold inductor and the hot support structures includes connection means comprising:
   an outer ring which is coaxial with the axis of rotation and integral with one of the two parts connected thereby;
   an inner ring which is integral with the other of said two parts and is disposed coaxially against the inner surface of the outer ring; and
   fly-weights spaced out angularly and fixed to the inner ring so that the centrifugal force exerted on the fly-weights by rotation of the rotor circumferentially expands the inner ring and presses it against the outer ring to lock these two rings together during rotation while allowing relative longitudinal movement thereof when there is no rotation.

2. A rotor according to claim 1, further including guides disposed parallel to the axis of the rotor at the interface between said two rings to prevent rotation of one ring relative to the other even when there is no centrifugal force.

3. A rotor according to claim 2, wherein two longitudinal key-ways are cut adjacent to each other in the adjacent surfaces of the two rings, and wherein said guides are round keys which occupy said longitudinal key-ways.

4. A rotor according to claim 2 in which at least one of said mechanical connections comprises a thin transition tube which is coaxial with the rotor and extends between a cold end fixed to the inductor and a hot end connected to a said support structure, and wherein said hot end is fixed to said inner ring whose diameter is substantially the same as that of the transition tube with said outer ring being included in said support structure.

5. A rotor according to claim 2, wherein each of said fly-weights is fixed on the inner surface of said inner ring over an angularly central zone of the fly-weight.

6. A rotor according to claim 5, wherein each of the fly-weights is fixed on the inner surface of the inner ring at a plurality of axially separated points along the centre line of the fly-weight.

7. A rotor according to claim 1, wherein the inner ring is sufficiently thin so as to expand substantially under the effect of the centrifugal force exerted by the fly-weights fixed on its inner surface, and wherein the outer ring is thicker than said inner ring to bear the centrifugal forces without any appreciable expansion.

* * * * *